Oct. 1, 1946.     M. MENNESSON     2,408,672
APPARATUS FOR MEASURING OR CHECKING TRANSVERSE DIMENSIONS
Filed March 3, 1945

INVENTOR
MARCEL MENNESSON
BY
ATTORNEY

Patented Oct. 1, 1946

2,408,672

UNITED STATES PATENT OFFICE 2,408,672

APPARATUS FOR MEASURING OR CHECKING TRANSVERSE DIMENSIONS

Marcel Mennesson, Neuilly-sur-Seine, France, assignor to Societe Anonyme Pour La Construction de Materiel Automobile (S. A. C. M. A.), Neuilly-sur-Seine (Seine), France, a society of the French Republic Application March 3, 1945, Serial No. 580,748
In France April 22, 1944

8 Claims. (Cl. 33—178)

The present invention relates to apparatus, the general shape of which is that of a V and which are therefore usually called V-blocks, for measuring or checking a transverse dimension, for instance the external diameter, of a piece, by pneumatic micrometry. These apparatus include two branches the plane faces of which are inclined with respect to each other so that the piece to be measured can be brought to bear against said faces. This piece is then located opposite the outlet orifice of a conduit opening into the atmosphere between these branches at the apex of the V, a permanent gas under pressure, for instance compressed air, being fed through this conduit toward said piece. The pressure of this gas, measured before this outlet orifice, thus varies as a function of the value of the interval existing between the orifice and the piece, and the variation of this pressure, determined through manometric measurement, can then serve to the obtainment of the desired dimension or to its comparison to a given dimension.

There are known measurement V apparatus of this kind in which the position of the conduit through which gas under pressure is fed is adjustable with respect to the inclined faces of the instrument, whereby the interval existing between the outlet of this conduit and the piece to be measured can be made substantially constant irrespective of the size of the diameter to be measured. However, when these diameters are very different from one another, their outlines, and in particular their radii of curvature, vary in accordance with the dimensions to a considerable degree, and as the shape of these pieces has a great influence on the measurements, due to the modification of the shape of the interval through which the gas under pressure can escape into the atmosphere, it is necessary to make use, for a given instrument, of different manometric scales adapted, in each particular case, to the magnitude of the diameters to be measured by means of the instrument.

There exist also V apparatus in which there is interposed, between a fixed, and not adjustable, outlet for the gas under pressure, and the piece to be measured, an intermediate part which thus fills more or less the interval existing between said outlet and said piece. In this case, the apparatus can be used only for measuring or checking up pieces the diameter of which corresponds substantially to a given value. When it is desired to measure a diameter of very different dimension, a rather important modification of the apparatus becomes necessary, or another instrument having different characteristics must be employed.

The object of the present invention is to provide a measurement apparatus of the type above specified which obviates the drawbacks which have just been mentioned, so that this apparatus is better adapted to meet the requirements of practice than those existing up to now.

According to a feature of the present invention, with this object in view, I combine, with an apparatus of the general construction above set forth, a pneumatic amplifying device including a movable contact member intended to be applied against the external wall of the piece to be measured when the latter is inserted between the oblique faces of the V, in contact with said faces, this contact member being adapted to control a valve interposed across the path of the stream of permanent gas under pressure (compressed air) the variations of pressure of which are to be measured, this pneumatic amplifying device being mounted in the body of the apparatus in such manner as to permit of varying at will its axial position in said body, that is to say the position of the outlet orifice with respect to the apex of the V.

Other features of the present invention will result from the following detailed description of some specific embodiments thereof.

Preferred embodiments of the present invention will be hereinafter described, with reference to the accompanying drawing, given merely by way of example, and in which.

In the following description, it will be supposed, in order to simplify explanations, that it is desired to measure or to check up the external diameter of a cylindrical piece.

Figure 1:
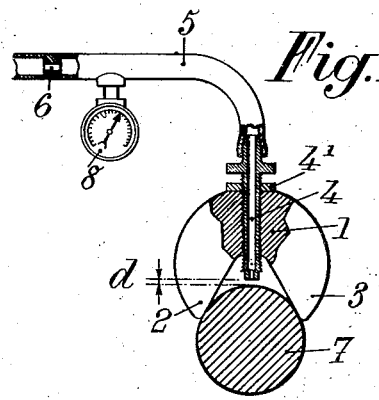
Fig. 1 is a diagrammatic elevational view, partly in section, of a measurement apparatus of the type with which the present invention is concerned, made according to a known construction and shown in order to facilitate explanations.

As above stated, the apparatus shown by Fig. 1 is of a known construction. It includes a body provided with two branches 2 and 3 inclined with respect to each other at a suitable angle and located on either side of the plane of symmetry of the body 1 of the apparatus in such manner as to form a V. At the apex of the V, that is to say where the branches converge (or, to be more accurate, slightly inside the angle of the V) is the outlet of a conduit 4 screwed in body 1 in such manner that its axial position with respect to said body can be modified at will. A locking nut $4^1$ makes it possible to secure conduit 4 in the desired position. Conduit 4 is connected with a tube 5 fed with a stream of permanent gas under pressure, preferably compressed air, through a calibrated orifice 6, itself fed with said gas under constant pressure.

When the piece 7 to be measured is engaged between the branches 2 and 3 of the V, until said piece is applied against the plane faces of said branches, a portion of the piece comes opposite the outlet of conduit 4. The position of said conduit has been adjusted in such manner that an interval equal to $d$ exists between said outlet and piece 7. According to the importance of this interval, air can escape more or less freely from conduit 4, which produces in tube 5 a corresponding pressure which is measured by means of any suitable manometric device such as 8. The indication given by the reading of the manometric scale makes it possible to determine the value of the diameter that has been measured or of comparing this value to that corresponding to the diameter of a standard piece.

In order to make it possible to utilize this apparatus for measuring or checking up several pieces having considerably different diameters, it is necessary to adjust, in each case, the axial position of conduit 4 with respect to body 1 in such manner that the interval between the outlet of this conduit and piece 7 keeps a substantially constant value $d$.

However, it is clear that, when the pieces 7 to be measured are of very different diameters, the same variation of interval $d$ produces different variations of the section of the passage provided for the outflow of the stream of compressed air. This is due to the fact that the radii of curvature of these pieces 7 influence the value of this section, since the apparatus with which the invention is concerned are based upon very accurate measurements. It follows that to each diameter there corresponds a well determined manometric scale and that the intervals between the graduations of these scales will vary according to the values of the diameters that are measured. Consequently, with an apparatus such as just above described with reference to Fig. 1, there must be as many different manometric scales as there are different categories of diameters to be measured or checked up.

Figure 2:
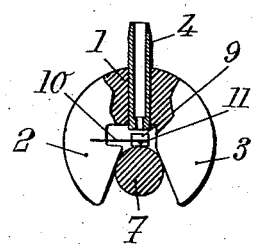
Fig. 2 is a similar view of another known apparatus of this type.

In the other known apparatus shown by Fig. 2, conduit 4 is in a fixed position with respect to the body 1 of the apparatus, and the outflow from said conduit is controlled through a kind of valve 9 supported by an elastic blade 10 which tends to move this valve away from its seat, that is to say away from the outlet of conduit 4. The piece 7 to be measured or checked up, when it is brought into contact with the plane faces of the branches 2 and 3 of the V pushes a part 11 carried by blade 10, so as more or less to close valve 9. Therefore, with this arrangement, the value of the section through which the compressed air stream can flow out into the atmosphere no longer depends upon the shape or the curvature of piece 7, as in the case of the apparatus of Fig. 1, but only upon its transverse dimension. However, this apparatus is adapted only to the measurement or the checking up of pieces the dimensions of which range within very close limits. This is so true that makers of this kind of apparatus have often replaced the two inclined faces of the V by two punctual contact elements, which shows that they intended each apparatus to be used only for the measurement of an extremely short range of diameters.

Therefore, with the known apparatus of the kind with which the invention is concerned, it is necessary either to use a different scale of graduations (Fig. 1) or a different apparatus (Fig. 2) for each category of diameters to be measured or checked up. This is a serious drawback.

In order to obviate this drawback, according to the present invention, the V type measurement apparatus is provided, in lieu of the conduit 4 above mentioned, with a pneumatic amplifying device with a contact member, such a device being known per se, and for instance as described in the French patent application No. 487,388, filed by the Société Anonyme de Construction de Matériel Automobile on January 26, 1944, for "Improvements in methods and apparatus for measuring or checking up a magnitude, for instance the dimensions of a piece by pneumatic micrometry." Furthermore, according to the present invention, this amplifying device is mounted in the body 1 of the apparatus in such manner that its axial position can be adjusted at will with respect to said body.

Figure 3:
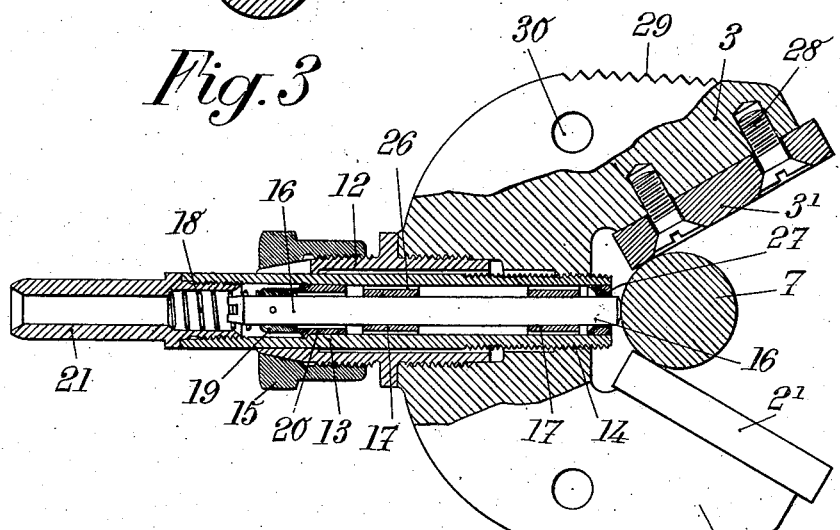
Fig. 3 shows, on a larger scale, also in elevation partly in section, a measurement apparatus according to the invention.

For this purpose, in the embodiment illustrated by Fig. 3, I fit, in an axial passage of the body 1 of the apparatus, a sleeve 12 the outer conical end of which is split in the longitudinal direction. In this sleeve, I engage a cylindrical tube 13, adapted to form a valve body, and which is screwed at 14 in the body 1 of the apparatus, in such manner that it is possible to modify at will the axial position of said tube 13 with respect to the said apparatus body. Once this adjustment has been effected, tube 13 may be secured in position by the tightening of a locking nut 15 which is screwed on the external split end of sleeve 12.

In this tube 13 is axially mounted a rod 16 forming a movable contact member one end of which projects from tube 13 at the end thereof that opens into the angle formed by the inclined branches 2 and 3 of the V. This rod 16 is guided by bearings 17 and it is mounted in such manner as to be slidable in tube 13 against the action of a return spring 18, when more or less pushed by piece 7 applied in the angle of the V against branches 2 and 3.

On rod 16, I fix a valve 19 which tends to be applied by spring 18 against a seat 20, the degree of opening of said valve depending upon the amplitude of the displacement imparted to rod 16 by the insertion of piece 7 between the branches of the V. This valve 19 controls the passage through which can flow the compressed air fed to the end 21 of tube 13 and intended to escape to the outside. The end 21 of tube 13 is connected, through a pipe 22 (Fig. 4), with a pressure regulating device 23 supplied with compressed air at 24, and on which is mounted a manometer or pressure gauge 25, for instance of the liquid type, with its graduated scale 26.

Compressed air, admitted through the end 21 of tube 13, can therefore flow past valve 19, which is more or less open, through the channels 26 provided longitudinally in bearings 17, through the annular passage 27 provided around the projecting end of rod 16 and escape into the atmosphere.

The apparatus thus constructed operates in the following manner:

Piece 7 is engaged into the angle of the V i. e. between the branches thereof, until it is in contact with the inclined faces of said branches. The axial position of the pneumatic amplifying device is then adjusted by loosening the locking ring 15 and screwing or unscrewing valve tube 13 in body 1. This adjustment is conducted in such manner that rod 16 is first brought into contact with piece 7 and that—supposing this piece 7 to be a standard piece of the exact dimension for such pieces—the degree of opening of valve 19 is such that the pressure read on the manometric scale of manometer 25 has a given value; for instance it is zero on graduated scale 26. Once this adjustment has been performed, tube 13 is secured by tightening the locking nut 15.

The apparatus having thus been adjusted for measurement of pieces 7 corresponding to the standard piece in question, these pieces can be tested and measured in the apparatus provided that their diameters do not differ too much from the standard dimension. The variations of diameter of the pieces tested in the apparatus merely produce differences in the position of valve 19, and consequently in the pressures indicated by manometer 25, without the curvature of the piece to be measured having any influence upon the indications thus obtained. Furthermore, if the manometric scale 26 is suitably graduated, it is possible directly to obtain the value of these variations in metric dimensions of pieces 7, for instance in thousandths of millimeters.

The advantage of a device made as above described is the following:

If it is desired to check up a piece the diameter of which is very different from that of piece 7, being for instance equal to twice the value of that of said piece 7, the same apparatus can be used. It suffices, for this purpose, to perform a new adjustment, analogous to that above described. A very simple calculation shows that, whatever be the diameter of the piece, a given variation of diameter produces always the same displacement of rod 16. Consequently, after a preliminary adjustment of the position of valve tube or body 13, the same graduated scale can be used, with the same accuracy, for all the pieces that can be introduced between the branches 2 and 3 of the V.

Consequently, the apparatus according to the invention permits of greatly reducing the number of instruments necessary for the measurement or checking up of diameters.

Advantageously, the inclined faces of the branches 2 and 3 of the V are fitted with plane plates $2^1$ and $3^1$, perfectly rectified, made of a hard metal so as to avoid their wearing, these plates being held in position through any suitable means, such for instance as screws 20. This arrangement makes it possible to constitute the body 1 of the apparatus in a metal which is less expensive and capable of being easily machined to the desired form.

Figure 4:
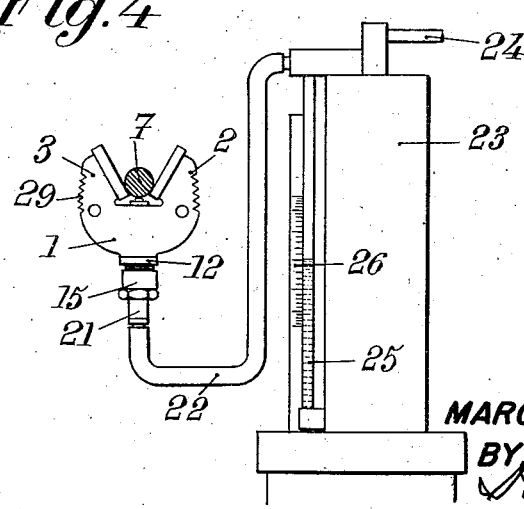
Fig. 4 is an elevational view of the installation of a pneumatic micrometer including a V measurement apparatus made according to the present invention.

In the embodiment illustrated by Figs. 3 and 4, the body of the apparatus is provided, on its periphery, with notches or knurled portions 29 located at suitable places on the outer faces of branches 2 and 3 to constitute holds for the fingers when the apparatus is being used.

The location of these notches or knurled portions along the branches of the V is chosen, according to the present invention, in such manner as to ensure an interesting result, as follows:

When the instrument is applied against piece 7, or said piece is applied against the inner faces of the V branches, these branches have a tendency to be forced apart from each other, i. e. the angle of the V tends to increase, which may be prejudicial to the accuracy of the measurement. But this drawback can be obviated by compensating the stress which tends to produce this deformation by the pressure of the fingers holding the apparatus on the outer sides of the body, if the fingers are applied at suitable points. These points are those indicated by notches 29 or the like, and it has been found that, when the location of these notches or the like is suitably determined as above set forth these two actions compensate each other whatever be the force exerted by the operator for establishing contact between piece 7 and the measurement apparatus. It is therefore of interest, in order to increase the accuracy of the measurement, imperatively to fix the places where the operator is holding the instrument, as obtained by the provision of notches or the like on the periphery of body 1 (Figs. 3 and 4).

These notches or the like further prevent the apparatus from sliding from the fingers in which it is held, whereby the handling of the apparatus is easier and safer.

It is necessary also to consider the case in which the V instrument is handled otherwise than by holding it with the fingers. For instance, the instrument may be fixed to a support by means of two lugs or projections engaging into holes 30 provided in branches 2 and 3. In this case, as in the preceding case, the location of these holes 30 is suitably chosen in such manner that the effort developed for applying the instrument against a piece 7 has a tendency to bring the branches 2 and 3 of the V toward each other, this displacement being opposed and reduced to zero by the reaction exerted by piece 7 on the branches, which tends to bring said branches away from each other.

Whatever be the particular embodiment that is chosen, I obtain a V type measurement instrument which is well adapted to the purpose above set forth and which, furthermore, has the advantage of being easy to handle and of eliminating some causes of error which have been found to exist in practice in the measurements or checkings up to be performed.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. An apparatus of the type described for the measurement of pieces which comprises, in combination, a body including two branches the opposite faces of which are plane and inclined with respect to each other so as to form a V, said body being provided with a radial passage opening into the apex of the V, a tube adjustable in said passage in the axial direction thereof, a push-rod slidable axially in said tube and projecting at one end therefrom into said V so as to be able to cooperate, through said end, with a piece to be measured and engaged between the branches of the V against the faces thereof, abutment means for preventing said rod from projecting into said V beyond a given position with respect to said tube, elastic means for urging said push-rod toward said position, a conduit for the flow of a gaseous stream open at one end into the atmosphere, means for feeding a permanent gas under pressure to the other end of said conduit, a valve in said conduit adapted to control the section of flow therethrough, said valve being operatively connected with said push-rod, cooperating with the piece to be measured so that a constant relation exists between the variations of pressure of the flowing gas and the variations of the measured dimension whatever the cross-section of said piece may be, and manometric means for measuring the pressure in said conduit.

2. An apparatus of the type described for the measurement of pieces which comprises, in combination, a body including two branches the opposite faces of which are plane and inclined with respect to each other so as to form a V, said body being provided with a radial passage opening into the apex of the V and extending in the direction of the bisector thereof, a push-rod slidable axially in said tube and projecting at one end therefrom into said V so as to be able to cooperate, through said end, with a piece to be measured and engaged between the branches of the V against the faces thereof, abutment means for preventing said rod from projecting into said V beyond a given position with respect to said tube, elastic means for urging said push-rod toward said position, said tube forming a conduit for the flow of a gaseous stream and being open at one end into the atmosphere, means for feeding a permanent gas under pressure to the other end of said tube, a valve in said tube adapted to control the section of flow therethrough, said valve being operatively connected with said push-rod, and manometric means for measuring the pressure in said tube ahead of said valve.

3. An apparatus of the type described for the measurement of pieces which comprises, in combination, a body including two branches the opposite faces of which are plane and inclined with respect to each other so as to form a V, said body being provided with a radial passage opening into the apex of the V and extending in the direction of the bisector thereof, a tube adjustable in said passage in the axial direction thereof, a push-rod slidable axially in said tube and projecting at one end therefrom into said V so as to be able to cooperate, through said end, with a piece to be measured and engaged between the branches of the V against the faces thereof, abutment means for preventing said rod from projecting into said V beyond a given position with respect to said tube, elastic means for urging said push-rod toward said position, bearings for guiding said push-rod in said tube, said bearings being provided with longitudinal channels affording an uninterrupted communication from one end to the other of said tube, said tube forming a conduit for the flow of a gaseous stream and being open at one end into the atmosphere, means for feeding a permanent gas under pressure to the other end of said tube, a valve in said tube adapted to control the section of flow therethrough, said valve being operatively connected with said push-rod, aand manometric means for measuring the pressure in said tube ahead of said valve.

4. An apparatus of the type described for the measurement of pieces which comprises, in combination, a body including two branches the opposite faces of which are plane and inclined with respect to each other so as to form a V, said body being provided with a radial passage opening into the apex of the V and extending in the direction of the bisector thereof, a tube adjustable in said passage in the axial direction thereof, a push-rod slidable axially in said tube and projecting at one end therefrom into said V so as to be able to cooperate, through said end, with a piece to be measured and engaged between the branches of the V against the faces thereof, abutment means for preventing said rod from projecting into said V beyond a given position with respect to said tube, elastic means for urging said push-rod toward said position, said tube forming a conduit for the flow of a gaseous stream and being open at one end into the atmosphere, means for feeding a permanent gas under pressure to the other end of said tube, a valve seat in said tube, a valve carried by said push-rod adapted to cooperate with said seat to control the section of flow through said tube, and manometric means for measuring the pressure in said tube ahead of said valve.

5. An apparatus of the type described for the measurement of pieces which comprises, in combination, a body including two branches the opposite faces of which are plane and inclined with respect to each other so as to form a V, said body being provided with a radial passage opening into the apex of the V and extending in the direction of the bisector thereof, a tube adjustable in said passage in the axial direction thereof, a push-rod slidable axially in said tube and projecting at one end therefrom into said V so as to be able to cooperate, through said end, with a piece to be measured and engaged between the branches of the V against the faces thereof, abutment means for preventing said rod from projecting into said V beyond a given position with respect to said tube, elastic means for urging said push-rod toward said position, said tube forming an annular conduit around said push-rod, for the flow of a gaseous stream, and said conduit opening into the atmosphere at the apex of said V, means for feeding a permanent gas under pressure to the other end of said tube, a valve seat in said tube, a valve carried by said push-rod adapted to cooperate with said seat to control the section of flow through said tube, and manometric means for measuring the pressure in said tube ahead of said valve.

6. An apparatus of the type described for the measurement of pieces which comprises, in combination, a body including two branches the opposite faces of which are plane and inclined with respect to each other so as to form a V, said body being provided with a radial passage opening into the apex of the V and extending in the direction of the bisector thereof, a tube adjustable in said passage in the axial direction thereof, a push-rod slidable axially in said tube and projecting at one end therefrom into said V so as to be able to cooperate, through said end, with a piece to be measured and engaged between the branches of the V against the faces thereof, said tube forming a conduit, for the flow of a gaseous stream, open into the atmosphere at the end thereof that opens into said V, means for feeding a permanent gas under pressure to the other end of said conduit, a valve seat in said tube, a valve carried by said push-rod adapted to cooperate with said seat to control the section of flow therethrough, elastic means for urging said valve toward its seat, and manometric means for measuring the pressure in said tube ahead of said valve.

7. An apparatus of the type described for the measurement of pieces which comprises, in combination, a body including two branches the opposite faces of which are plane and inclined with respect to each other so as to form a V, said body being provided with a radial passage opening into the apex of the V and extending in the direction of the bisector thereof, a tube screwed in said body so as to be adjustable in said passage in the axial direction thereof, means for securing said tube with respect to said body in any given position of adjustment, a push-rod slidable axially in said tube and projecting at one end therefrom into said V so as to be able to cooperate, through said end, with a piece to be measured and engaged between the branches of the V against the faces thereof, abutment means for preventing said rod from projecting into said V beyond a given position with respect to said tube, elastic means for urging said push-rod toward said position, a conduit for the flow of a gaseous stream open at one end into the atmosphere, means for feeding a permanent gas under pressure to the other end of said conduit, a valve in said conduit adapted to control the section of flow therethrough, said valve being operatively connected with said push-rod, and manometric means for measuring the pressure in said conduit.

8. An apparatus of the type described for the measurement of pieces which comprises, in combination, a body including two branches the opposite faces of which are plane and inclined with respect to each other so as to form a V, said body being provided with a radial passage opening into the apex of the V and extending in the direction of the bisector thereof, a tube screwed in said body so as to be adjustable in said passage in the axial direction thereof, a sleeve surrounding said tube fixed in said body, one end of said sleeve being split, and a nut screwed on said sleeve about the split end thereof so as to tighten said sleeve on said tube and to secure the latter in the desired position of adjustment, a push-rod slidable axially in said tube and projecting at one end therefrom into said V so as to be able to cooperate, through said end, with a piece to be measured and engaged between the branches of the V against the faces thereof, abutment means for preventing said rod from projecting into said V beyond a given position with respect to said tube, elastic means for urging said push-rod toward said position, a conduit for the flow of a gaseous stream open at one end into the atmosphere, means for feeding a permanent gas under pressure to the other end of said conduit, a valve in said conduit adapted to control the section of flow therethrough, said valve being operatively connected with said push-rod, and manometric means for measuring the pressure in said conduit.

MARCEL MENNESSON.